Nov. 8, 1960

J. F. JAMES 2,959,777

RADAR DISPLAY SYSTEM

Filed Feb. 28, 1955

INVENTOR
JOHN FREDERICK JAMES,
BY
Baldwin & Wright
ATTORNEYS

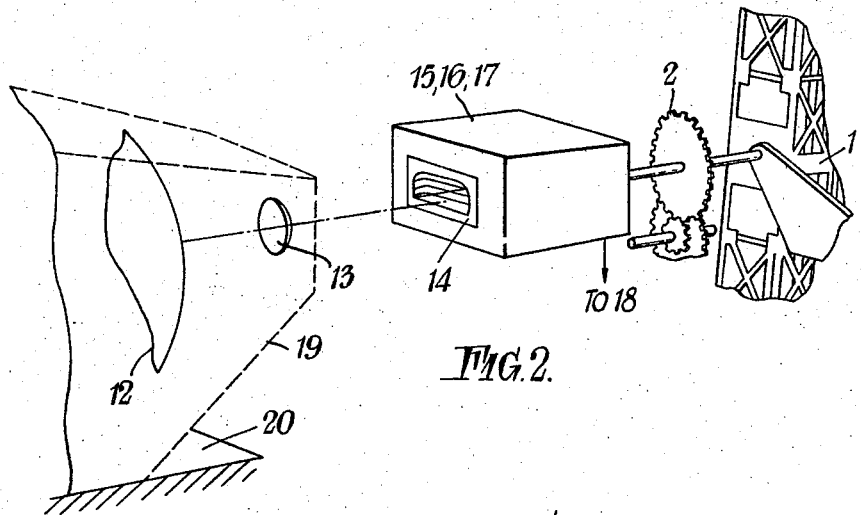
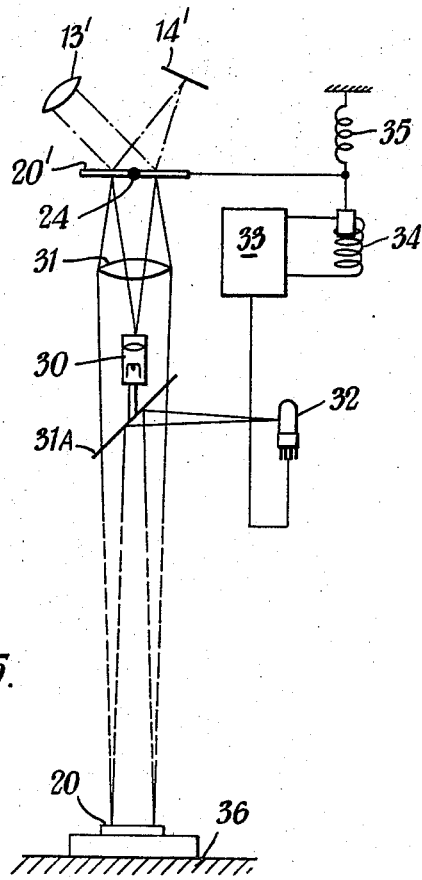

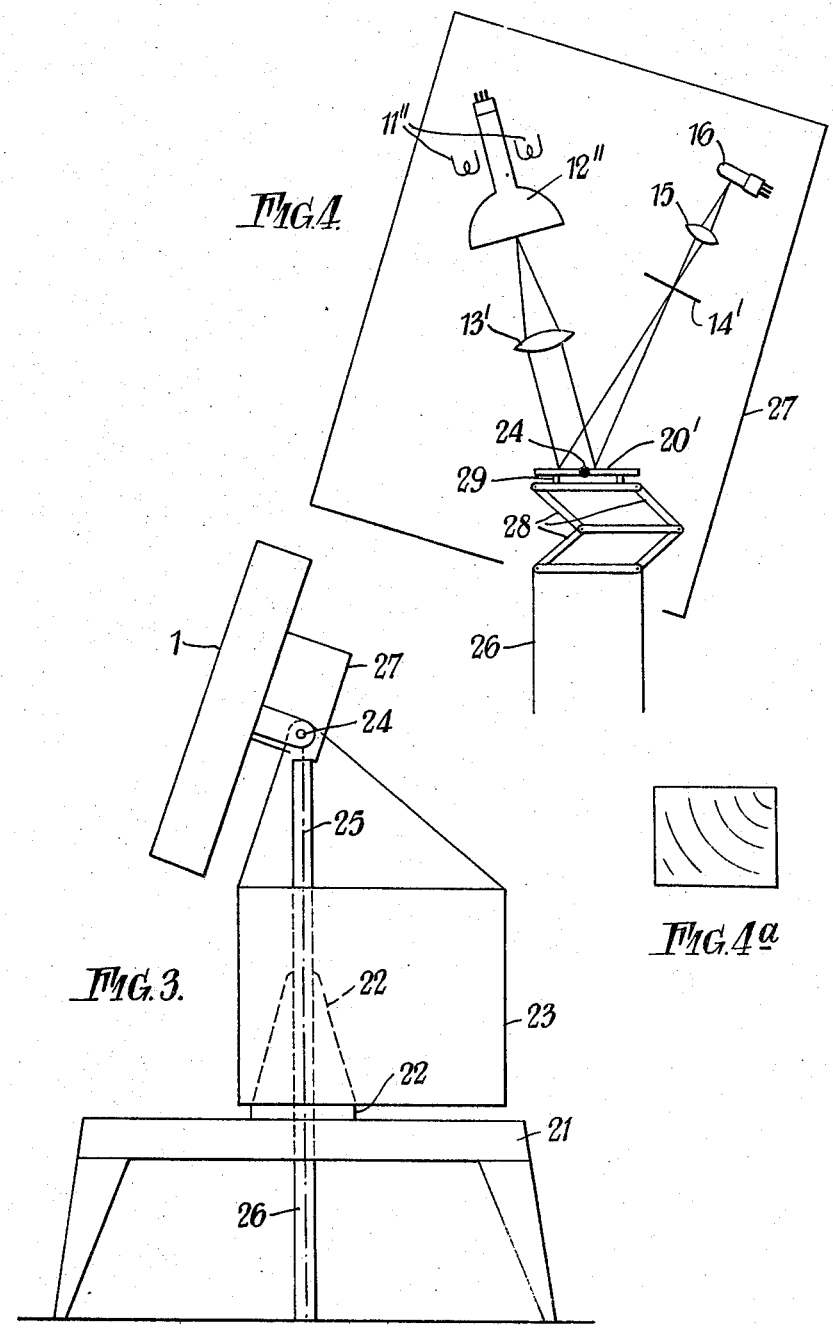

United States Patent Office 2,959,777
Patented Nov. 8, 1960

2,959,777
RADAR DISPLAY SYSTEM

John Frederick James, Little Baddow, England, assignor to Marconi's Wireless Telegraph Company Limited, London, England, a British company Filed Feb. 28, 1955, Ser. No. 491,135

Claims priority, application Great Britain Mar. 1, 1954

7 Claims. (Cl. 343—5)

This invention relates to height displaying radar systems.

It is known in height displaying radar systems, to use a cathode ray display tube subjected to radial deflection by a time base so as to be a function of range and simultaneous circular deflection in dependence upon the angle of elevation with relation to the horizontal of an aerial whose elevation is varied so as to scan zenithally, the display being viewed through a mask consisting of constant height lines, each line being the locus of points whose relation between elevation and range corresponds to the same height.

Such a display arrangement has the inherent difficulty of poor discrimination and liability to errors, particularly as respects long range targets. Thus a distant target can change in height very substantially and produce only a small change in elevation with the result that there is an actual limitation in discrimination due to the finite size of the spot. This difficulty can, as is known, be avoided by providing electronic means for selecting a particular part of the total area looked at and expanding the display for that part but if this is done the same constant height line mask cannot be used, as was used for an unexpanded display.

The object of my invention is to provide a system for indicating heights in the display of radar patterns where a horizontal reference plane is provided and where undesired deflections caused by displacement of the aerial support, due to wind or other forces, or rotation in azimuth of the antenna or other physical changes in the capacity to ground relationship, are eliminated.

Another object of my invention is to provide a radar display system wherein part of the optical assembly system is directly coupled with a nodding aerial structure and is displaceable in conformity therewith in reproducing the radar readings.

Still another object of my invention is to provide an arrangement of display tube and flying spot scanner for a radar system in association with a coupling arrangement between part of the optical system assembly and the nodding aerial structure of the radar system.

According to this invention a height displaying radar system comprises a first cathode ray tube acting as a flying spot scanner, the cathode ray beam of the tube being arranged for linear deflection in dependence upon range, a mask upon which is marked lines of constant height, the mask being arranged for scanning by said first tube, means for producing relative circular movement between the line produced by the linear deflection and said mask, in dependence upon the angle of elevation with respect to the horizontal of an aerial whose elevation is varied so as to scan zenithally, a second cathode ray tube acting as a display tube, the cathode ray beam of the latter tube being arranged to be subjected to simultaneous radial and circular deflection respectively dependent upon range and angle of elevation, and means for modulating the cathode ray beam in said second cathode ray tube, not only with signals derived from reflected target echoes but also with signals derived by the scanning of said mask by the first tube, the arrangement being such that when an electronic control is applied to select, or to magnify, or to off-set, any part of the display in the second tube, a corresponding modifying change will take place in the representation of the mask (or part theerof) produced in said second cathode ray tube.

For a better understanding of the invention and to show how the same will be carried into effect, reference will now be made to the following specification and the accompanying drawings in which—

Fig. 2 shows diagrammatically the direct mounting arrangement of the height lines slide unit with reference to the flying spot scanning tube of the embodiment shown in Fig. 1;

Fig. 3 shows diagrammatically an embodiment of the aerial structure of the radar system;

Fig. 4 shows diagrammatically a detail of the embodiment shown in Figure 3;

Fig. 4a shows diagrammatically the shape of the lines appearing upon the height lines slide of Fig. 4; and Fig. 5 shows diagrammatically a modification of the embodiment shown in Figs. 3 and 4.

Figure 1:
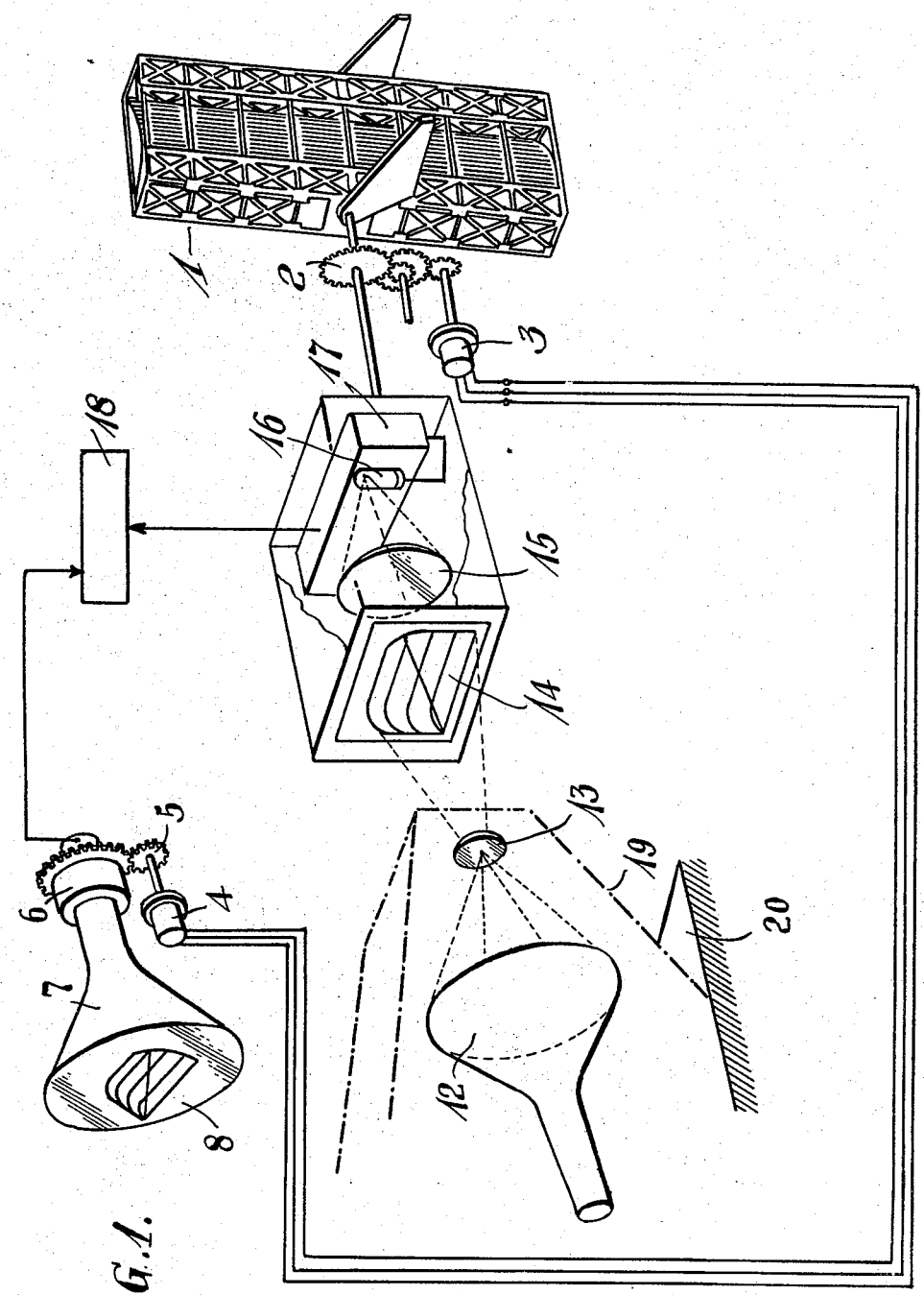
Fig. 1 shows diagrammatically a height displaying radar system including the direct mounting of the height lines slide unit as part of the nodding aerial structure.

Referring to the drawings in detail, reference character 1 designates a scanning aerial structure of the "nodding" type, that is to say it is moved in such a direction as to scan in the zenithal plane. The angular movement of the "nodding" aerial structure is imparted through step-up gear 2 to a selsyn generator 3 from which is driven a further selsyn motor indicated at 4. The selsyn motor 4 drives through a reduction gearing 5 a rotating deflection coil 6 of a normal height/range display tube 7. Radar echo signals are applied from a video amplifier 18 to the modulating electrode of the tube 7 and by this means received echoes are indicated in height and range on the display 8 in the normal manner.

The cathode ray tube 12 is the flying spot scanning tube of a video mapping unit, which unit further consists of condenser lens 13, a height lines slide 14, a further condenser lens 15 and photo-electric cell 16. The position of the scanning spot on the screen of video mapping tube 12 indicates the angular movement of the "nodding" aerial with respect to the horizontal. As the flying spot scans over the video mapping tube 12 light emerges from its short after-glow screen. On the slide 14 are marked lines indicating constant height so that as this slide is scanned by the emergent light spot from the screen of the tube 12 the optical input to photo-electric cell 16 will be modulated by the constant height lines. Output from the photo-electric cell 16 is passed through a video amplifier 17 and thence to the video amplifier 18 of the normal height/range display tube.

It will be clear from the foregoing description that the height/range displaying tube 7 is also modulated with the output signal from the video mapping photo-electric cell 16, with the result that there will be superimposed on the normal height/range display on tube 7, the lines indicating constant height as shown on the display at 8. With such a type of display it is possible to expand, off-center or to otherwise move the P.P.I. picture and simultaneously the video height lines will move with the display.

The accuracy of the height line display is clearly dependent upon the accuracy of the correlation between the movement of the photo-electric cell assembly 6 and the zenithal angular movement of the aerial structure 1, and also on the correlation between the scan range and the height lines on the height lines slide 14. It will be noted with this system that the accuracy of the display is not dependent on the accuracy of the transmission of data to the height display tube 7 because the height calibration as provided by the video mapping unit will form a part of the actual display on tube 7 and consequently the height line calibration will be in error to the same extent as the video display itself.

It is important in carrying out this invention that the mechanical coupling between the aerial structure 1 and the photo-electric cell assembly should be as close as possible so as to ensure the highest degree of accuracy. For the purpose of ensuring the maximum accuracy the photo-electric cell assembly 16 may be mounted in proximity with the aerial structure 1 and direct mechanical coupling employed between them.

In the embodiment shown in Fig. 1, a rotating coil equipment has been illustrated in association with tube 7, the rotating coil 6 being driven by the selsyn motor 4. There are distinct advantages, from the point of view of accuracy, in driving the photo-electric cell assembly 16 mechanically. The advantages are of practical importance due to the stringent accuracy requirements of any height finder system using a nodding aerial, for 5 minutes of arc, in elevation, is equivalent to 800 feet at 100 nautical miles so that elevation should be known to better than 5 minutes of arc. It is, therefore, of practical advantage to dispense with the selsyn motor in so far as tube 12 is concerned and mount the bulk of the equipment so that the position of photo-electric cell assembly 16 can be controlled directly through suitable gears from the nodding aerial.

Even, however, when every precaution is taken to ensure that the coil 6 follow the movements of the nodding aerial 1 with faithful precision there still remains a further difficulty. To be of value elevation must, of course, be known in relation to a horizontal reference plane and in the embodiments so far described elevation is only determined in relation to some portion of the aerial support structure. In practice, however, it is almost impossible to avoid some deflection of such a structure due to wind forces, or as it rotates in azimuth, so that it is almost impossible to obtain a true and constant horizontal reference plane by using a non-nodding part of the aerial structure to provide the same. The structure of my invention provides a reference platform 20 which is separate from the aerial structure 1 and which is so arranged as to be substantially free of wind or other stresses and either fixed by being firmly anchored to the ground or suitably stabilized. Thus, for example, the reference plane may be provided at the top of a heavy rigid tube with its axis vertical, said tube being firmly fixed in the ground and passing up through the rotational axis of the usual cabin housing the radar apparatus and carrying the nodding aerial. This tube is not attached to the cabin in any way so that, when the said cabin is rotated for varying the azimuth, it does so round the fixed tube which, incidentally, it protects from wind effects. Alternatively, the reference plane may be freely attached to the aerial structure stabilized by gravitation or gyroscopic means or by the provision of a servo system controlled by an optical or electromagnetic reference. In either case it is important that mechanical loading, especially varying loading, on the member carrying the reference plane should be as small as possible and the drawings show arrangements in which this requirement has been satisfied.

Referring to Fig. 2 I have shown schematically the mechanical connection of the scanning unit with the "nodding" aerial according to the system of Fig. 1. The arrangement consists in directly mounting on the horizontal shaft of the nodding aerial structure 1, the unit marked 14, 15, 16, 17 hereinbefore referred to as the photo-electric cell assembly 16 which comprises the height lines slide 14, the lens 15, the cell 16 and the amplifier 17 diagrammatically shown in Fig. 1. The elements 15, 16, 17 are shown separately in Fig. 1, but in Fig. 2 they are shown assembled within the box which is so marked. Thus this unit 14—15—16—17 oscillates about the axis of the aerial shaft with the aerial 1. The display tube 7 shown in Fig. 1 has its coil 6 driven directly or through selsyn motors as shown in Fig. 1 by gearing, the first gear 2 of which alone, is fully shown in Fig. 2. The gear 2 drives a gear assembly as shown in Fig. 1 connected to selsyn generator 3 which in turn drives selsyn motor 4, operating gear 6 meshed with a gear on the base of tube 7 for orienting the tube. The flying spot tube 12 is mounted, with its associated condenser lens 13, in a suitable mounting box 19 as shown in Fig. 2 firmly anchored on the horizontal reference plane schematically represented at 20, which latter may, as already stated, be an anchored or stabilized structure. Since the unit 14, 15, 16, 17 of Fig. 2 oscillates with the nodding aerial the only deflection provided for the tube 12 is an optical radial deflection proportional to range. As will be apparent the reference plane 20 carries no varied mechanical loads and it, and the unit it carries, may be fixed at the axis of the usual azimuth-rotational cabin by which the nodding aerial is carried. For convenience, in Fig. 2 the aerial shaft, gearing 2, and unit 14, 15, 16, 17 are shown side by side but in practice, of course, the mechanical drive from the aerial would be arranged so that the said unit is inside the cabin (not shown).

Referring now to Fig. 3, there is a base 21 on which is a turntable assembly 22 on which is a cabin structure 23 which is rotatable in azimuth in the usual way. The nodding aerial 1 is carried by the cabin structure 23 and can be oscillated about a horizontal axis 24 passing through, or nearly through, the vertical axis 25 about which the cabin structure 23 can rotate for azimuth variation. A pillar which, in the illustrative embodiment, is in the form of a rigid vertical tubular member 26 firmly fixed into the ground passes quite freely up through the center of the turntable assembly 22 and terminates at the base of an enclosure 27 attached to the aerial structure 1 and housing the flying spot equipment now to be described. This equipment shown in Fig. 4 comprises a flying spot cathode ray tube 12″, a lens 13′, a plane mirror 20′, a slide 14′ marked with lines of constant height, the further lens 15 and the photo-electric cell 16. The photo-electric cell 16 provides an output which is utilized in the same way as in the arrangement of Fig. 1, but, in order to simplify the showing of Fig. 4 the display tube 7 and its associated parts and the units 17 and 18 are omitted from the drawing. The deflection of the ray in the tube 12″ is merely a linear deflection (normal to the plane of the paper) and preferably extends across the full diameter of the tube screen, the deflection being produced in well known way by coils 11″ energized by a suitable time base (not shown). The line produced on the screen of the tube 12″ is focussed on the mirror 20′ in whose plane lies the axis 24. The reflecting surface of this mirror is, in effect, the reference plane and the mirror is carried from the tube 26 in such manner as to leave it free to move up and down (in case, in practice, there should be any up or down movement of the axis 24) while remaining however always horizontal. In the figure this result is obtained by the parallel link motion 28 and the mirror is on a turntable 29 to allow the axis 24 to rotate for azimuth variation. It will be apparent to those skilled in the art that the shape of the constant height lines on the slide 14′ will be different from those of the slide 14 of Figs. 1 and 2 and Fig. 4A shows, by a face view, the type of line shape required here.

If desired, instead of mounting the mirror 20′ mechanically upon the tube 26, as in Fig. 4, it may be mechanically independent thereof, and be automatically stabilized to maintain itself horizontal so as to act as a reference plane. Fig. 5 shows one arrangement of this nature.

Here the mirror 20' is made reflecting on both sides, the upper side being employed in the same way as in Fig. 4 by apparatus which is not repeated in the showing of Fig. 5. A light source 30 projects a beam of light through lens 31 onto the underside of mirror 20' and this is reflected back through the same lens to pass through a 45° mirror 31A of which one half only is semi-silvered to a second mirror 20 which is accurately horizontal, and is fixed to the ground 36 below the complete equipment. This mirror 20 reflects back the light to the mirror 31A whence part is reflected to a photoelectric cell 32 onto which the light is focussed. The output of the photo-electric cell 32, after amplification, by an amplifier 33 is fed to a solenoid 34 pulling against a spring 35 and controlling the angle of the mirror 20' with respect to the horizontal as indicated diagrammatically. If the two mirrors 20 and 20' are exactly parallel, i.e. so that mirror 20' is horizontal, approximately one half of the light beam will reach mirror 31A and will be reflected thereby to the photo-electric cell 32 which latter will therefore give a certain definite output. The arrangement is made such that, in this condition the pull of solenoid 34 against spring 35 just holds the mirror 20' parallel to mirror 20. Any departure from this condition will, however, change the energization of photo-electric cell 32 and therefore weaken or strengthen (in dependence upon the sense of the departure) the pull of solenoid 34. This change is made such as to produce automatic restoration of parallelism between the mirrors 20' and 31A.

While I have described my invention in certain of its preferred embodiments I realize that modifications may be made and I desire that it be understood that no limitations upon my invention are intended except as imposed by the scope of the appended claims.

I claim:

1. A radar system comprising an aerial structure, supporting means for said aerial structure for pivotally mounting said aerial structure about a horizontal axis, means for varying the angle of inclination of said structure about said axis to cause said structure to scan zenithally, means providing a horizontal reference platform containing said axis, said means for varying said angle of inclination being independent of said horizontal reference platform, a first cathode ray tube adapted to act as a flying spot scanner, means for linearly deflecting the beam in said tube in dependence upon range, a mask marked with lines of constant height and positioned to be scanned by said tube, means for producing relative movement between the line produced by said linear deflection and said mask in dependence upon variation of said angle of inclination of said structure with relation to said platform, a second cathode ray tube adapted to act as a display tube and having a cathode ray beam subjected to radial deflection in dependence upon range and simultaneous circular deflection dependent upon variation of the angle of inclination of said structure with relation to said platform, means for modulating the cathode ray beam in said second tube both with signals corresponding to reflected target echoes and signals produced by the scanning of said mask by said first tube, a supporting pillar, means for mounting said reference platform with respect to said pillar, said pillar being housed within the supporting means for said aerial structure, said aerial structure being movable independently of the pillar.

2. A radar system comprising an aerial structure, supporting means for said aerial structure for pivotally mounting said aerial structure about a horizontal axis, means for varying the angle of inclination of said structure about said axis to cause said structure to scan zenithally, means providing a horizontal reference platform containing said axis, said means for varying said angle of inclination being independent of said horizontal reference platform, a first cathode ray tube adapted to act as a flying spot scanner, means for linearly deflecting the beam in said tube in dependence upon range, a mask marked with lines of constant height and positioned to be scanned by said tube, means for producing relative movement between the line produced by said linear deflection and said mask in dependence upon variation of said angle of inclination of said structure with relation to said platform, a second cathode ray tube adapted to act as a display tube and having a cathode ray beam subjected to radial deflection in dependence upon range and simultaneous circular deflection dependent upon variation of the angle of inclination of said structure with relation to said platform, means for modulating the cathode ray beam in said second tube both with signals corresponding to reflected target echoes and signals produced by the scanning of said mask by said first tube, a supporting pillar, means for mounting said platform with respect to said pillar, said pillar being substantially coaxial with the rotational axis in azimuth of the aerial structure whereby said aerial structure may be rotated in azimuth about said pillar and independently thereof.

3. A radar system comprising an aerial structure, supporting means for said aerial structure for pivotally mounting said aerial structure about a horizontal axis, means for varying the angle of inclination of said structure about said axis to cause said structure to scan zenithally, means providing a horizontal reference platform containing said axis, said means for varying said angle of inclination being independent of said horizontal reference platform, a first cathode ray tube adapted to act as a flying spot scanner, a photo-electric cell coacting with said first cathode ray tube, means for linearly deflecting the beam in said tube in dependence upon range, a mask marked with lines of constant height and positioned to be scanned by said tube, means for producing relative movement between the line produced by said linear deflection and said mask in dependence upon variation of said angle of inclination of said structure with relation to said platform, a second cathode ray tube adapted to act as a display tube and having a cathode ray beam subjected to radial deflection in dependence upon range and simultaneous circular deflection dependent upon variation of the angle of inclination of said structure with relation to said platform, means for modulating the cathode ray beam in said second tube both with signals corresponding to reflected target echoes and signals produced by the scanning of said mask by said first tube, said reference platform being constituted by a mirror, a supporting pillar, azimuthal rotation means carried by said pillar, means for supporting said mirror on said azimuthal rotation means, upward and downward adjusting means for said mirror located on said azimuthal rotation means, the axis of zenithal rotation passing through the plane of said mirror, and an optical system located between said first cathode ray tube and said photoelectric cell associated therewith, the surface of said mirror being interposed in the light path of said optical system.

4. A radar system comprising supporting means for said aerial structure for pivotally mounting said aerial structure about a horizontal axis, means for varying the angle of inclination of said structure about said axis to cause said structure to scan zenithally, means providing a horizontal reference platform containing said axis, said means for varying said angle of inclination being independent of said horizontal reference platform, a first cathode ray tube adapted to act as a flying spot scanner, means for linearly deflecting the beam in said tube in dependence upon range, a mask marked with lines of constant height and positioned to be scanned by said tube, means for producing relative movement between the line produced by said linear deflection and said mask in dependence upon variation of said angle of inclination of said structure with relation to said platform, a second cathode ray tube adapted to act as a display tube and having a cathode ray beam subjected to radial deflection in dependence upon range and simultaneous circular deflection dependent upon variation of the angle of inclination of said structure with relation to said platform, means for modulating the cathode ray beam in said second tube both with signals corresponding to reflected target echoes and signals produced by the scanning of said mask by said first tube, and means for stabilizing said reference platform with respect to a fixed horizontal plane.

5. A radar system comprising an aerial structure, supporting means for said aerial structure for pivotally mounting said aerial structure about a horizontal axis, means for varying the angle of inclination of said structure about said axis to cause said structure to scan zenithally, means providing a horizontal reference platform containing said axis, said means for varying said angle of inclination being independent of said horizontal reference platform, a first cathode ray tube adapted to act as a flying spot scanner, means for linearly deflecting the beam in said tube in dependence upon range, a mask mounted with lines of constant height and positioned to be scanned by said tube, means for producing relative movement between the line produced by said linear deflection and said mask in dependence upon variation of said angle of inclination of said structure with relation to said platform, a second cathode ray tube adapted to act as a display tube and having a cathode ray beam subjected to radial deflection in dependence upon range and simultaneous circular deflection dependent upon variation of the angle of inclination of said structure with relation to said platform, means for modulating the cathode ray beam in said second tube both with signals corresponding to reflected target echoes and signals produced by the scanning of said mask by said first tube, an optical system, and means for stabilizing said horizontal reference platform under control of said optical system.

6. A radar system comprising a first cathode ray tube acting as a flying spot scanner, the cathode ray beam of the tube being arranged for linear deflection in dependence upon range, a mask upon which is marked lines of constant height, the mask being arranged for scanning by said first tube, means for producing relative circular movement, between the line produced by the linear deflection and said mask, in dependence upon the angle of elevation with respect to the horizontal of an aerial structure whose elevation is varied so as to scan zenithally, a second cathode ray tube acting as a display tube, the cathode ray beam of the latter tube being arranged to be subjected to simultaneous radial and circular deflection respectively dependent upon range and angle of elevation, means for modulating the cathode ray beam in said second cathode ray tube, not only with signals derived from deflected target echoes but also with signals derived by the scanning of said mask by the first tube, the said platform being constituted by a first mirror having reflecting surfaces on both sides thereof, an optical system, stabilizing means for stabilizing said platform with respect to a fixed horizontal plane, said stabilizing means comprising a second mirror, the reflecting surface of which is positioned in an accurately determined horizontal plane, and which is fixedly located opposite to, and spaced from, the other surface of the first mirror, a third mirror which is partly light reflecting and partly light transmitting interposed between said other surface and second mirror, a photo-electric cell, an optical arrangement, including a light source, for projecting a beam of light from the source to the photo-electric cell along a light path which includes the said other surface, the second mirror and the third mirror, control means for maintaining said other surface in parallel relationship with the horizontal plane and means for feeding output from the photo-electric cell to the control means being actuated in dependence upon the sense and magnitude of the output from the photo-electric cell, said control means operating to restore the output of the photo-electric cell to a predetermined value characteristic of the desired parallel relationship.

7. A radar system comprising an aerial structure, supporting means for said aerial structure for pivotally mounting said aerial structure about a horizontal axis, means for varying the angle of inclination of said structure about said axis to cause said structure to scan zenithally, means providing a horizontal reference platform containing said axis, said means for varying said angle of inclination being independent of said horizontal reference platform, a first cathode ray tube adapted to act as a flying spot scanner, a photo-electric cell associated with said first cathode ray tube, means for linearly deflecting the beam in said tube in dependence upon range, a mask marked with lines of constant height and positioned to be scanned by said tube, means for producing relative movement between the line produced by said linear deflection and said mask in dependence upon variation of said angle of inclination of said structure with relation to said platform, a second cathode ray tube adapted to act as a display tube and having a cathode ray beam subjected to radial deflection in dependence upon range and simultaneously circular deflection dependent upon variation of the angle of inclination of said structure with relation to said platform, means for modulating the cathode ray beam in said second tube both with signals corresponding to reflected target echoes and signals produced by the scanning of said mask by said first tube, control means comprising a solenoid winding having a movable armature, means for energizing said winding from the output of said photo-electric cell, spring means connected between a point on the aerial structure and said platform and a connection between said platform and said armature whereby the output of said photo-electric cell in deviating from a predetermined value controls the energization of said winding and the movement of said armature, whereby said platform is caused to move under the action of the combined effects of said spring means and the movement of said armature for restoring the desired parallel relationship.

References Cited in the file of this patent
UNITED STATES PATENTS
2,622,240     Williams _____ Dec. 16, 1952